July 5, 1932.  R. R. CLARK ET AL  1,865,558
HOLDING DEVICE
Filed Feb. 25, 1931
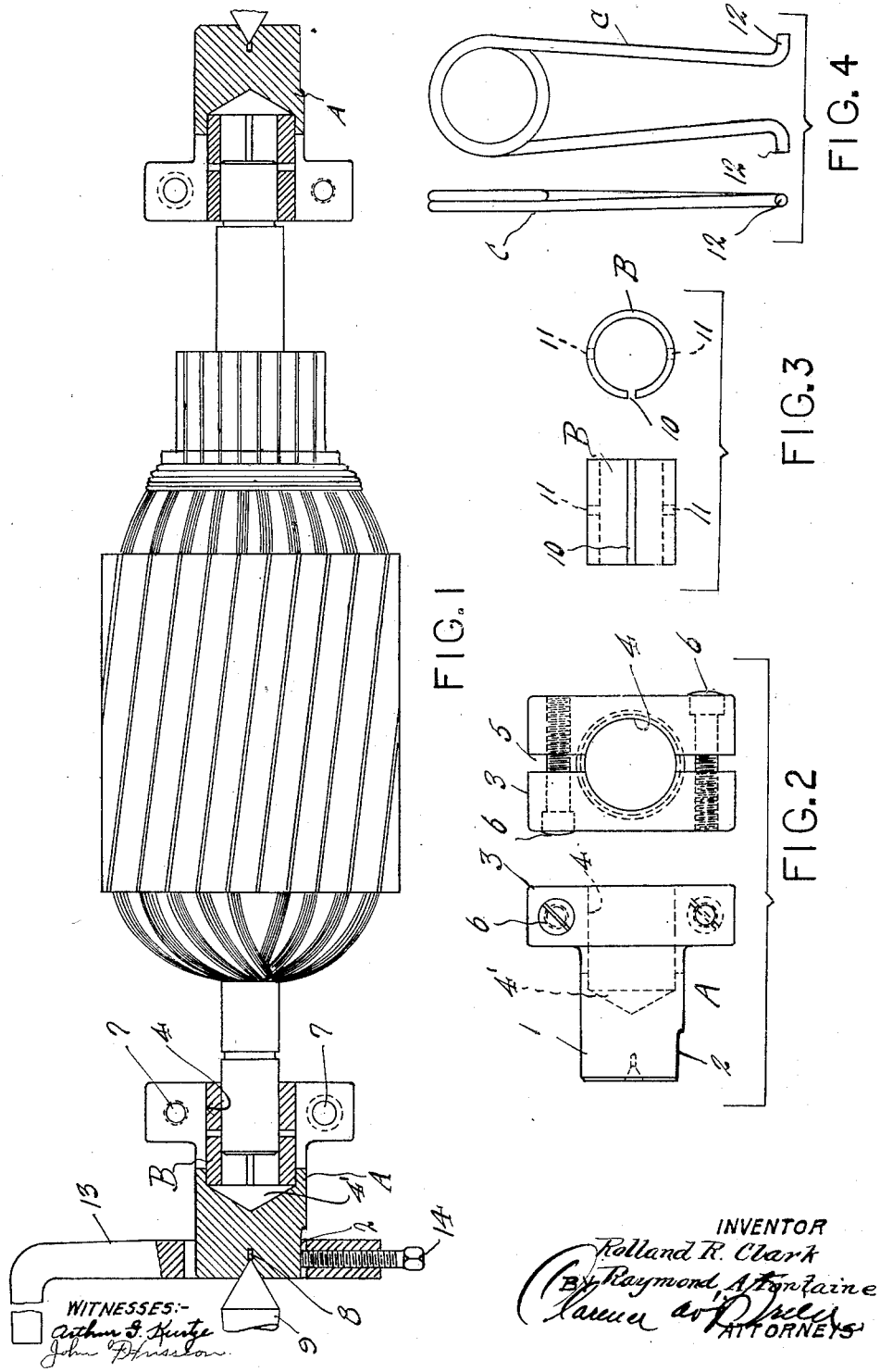
INVENTOR
Rolland R. Clark
Raymond A. Fontaine
ATTORNEYS Patented July 5, 1932

1,865,558

UNITED STATES PATENT OFFICE

ROLLAND R. CLARK AND RAYMOND A. FONTAINE, OF NEW HAVEN, CONNECTICUT

HOLDING DEVICE

Application filed February 25, 1931. Serial No. 518,282.

This invention relates to a holding device for holding shafts and the like in a lathe or the like, the general object of the invention being to provide a holder for each end of a shaft or other object which is not provided with a center hole or the center hole therein is not concentric, each holder having a center hole by which the holders and the shaft or other object supported thereby may be placed in a lathe or the like so that any machine work can be performed on the shaft or other object.

A further object of the invention is to provide split bushings for the holders, the outer circumferences of which are made to fit the bores of the holders, and the inner diameter of which are made to fit different sizes of shafts or other objects so that the holder can be used with shafts or the like of different sizes.

A further object of the invention is to provide means whereby a lathe dog can be fastened to one of the holders.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a sectional view showing a pair of the improved holders and an armature shaft with the lathe centers engaging the center holes of the ends of the holders, and with a lathe dog connected with one of the holders.

Fig. 2 is an elevation and end view of one of the holders.

Fig. 3 is a side view and end view of a split sleeve.

Fig. 4 is a side view and end view of a tool for extracting a bushing from a holder.

In this drawing, the holders are shown at A and each holder comprises a body part consisting of an elongated portion 1 substantially circular shape in cross section, and having a flat part 2 at its outer end and at the bottom thereof, and an enlargement 3. Each holder is formed with a bore 4 which passes through the end to which the enlargement 3 is connected to a point adjacent the opposite end of the part 1, the inner end of the bore being preferably of conical shape as shown at 4'. The holder is formed with a diametrical slot 5 which passes through the enlargement 3 and partly into the portion 1 so that the two portions separated by the slot are slightly resilient, thus permitting them to be clamped to a shaft or other object when the screws 6 passing through the holes 7 in the enlargement 3, are tightened.

As shown in Fig. 2, the heads of the screws are countersunk into the device. Each holder is also provided with a center hole 8 at its outer end for receiving a lathe center 9 as shown in Fig. 1.

We also provide a number of split bushings or sleeves B for enabling the holders to be used on shafts or other objects which are smaller in diameter than the bore of the holder. Each sleeve is split as shown at 10 and its exterior diameter is such as to permit it to be placed in the bore of the holder and the inner diameter of the sleeve is such as to fit a shaft which is too small to be used with the holder alone.

Thus by providing a plurality of these sleeves having different internal diameters, the invention can be used for different sizes of shafts.

Each sleeve is provided with a pair of recesses 11, the recesses being diametrically opposite each other and we also provide a tool C, the outwardly bent ends 12 of which are adapted to engage the recesses 11 so that a sleeve can be extracted from a holder.

From the foregoing it will be seen that these holders can be used to support shafts such as the shaft of the armature D shown in Fig. 1 and where such shafts are not provided with center holes for enabling the shaft to be held by the lathe centers of a lathe or wherein the holes are not concentric.

The holders are easily and quickly attached to the shaft by tightening the bolts or screws 6 and if the holders are too large for the shaft, a bushing such as B of suitable interior diameter is used with the holder.

A lathe dog 13 can be attached to either one of the holders through means of the set screw 14 engaging the flat part 2 of the holder as shown in Fig. 1.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described our invention, what we claim as new is:—

1. A holding device of the class described comprising a body part having an enlargement at one end thereof with a bore in said body part passing through the enlarged end to an appreciable distance from the other end, the enlarged end of the body part being split to make this end of the device slightly resilient, screws passing through the enlarged part for imparting a clamping action to the resilient portion, the closed end of the body part having a center hole therein, and a split bushing adapted to be inserted in the bore whereby the device can be used on an object of smaller diameter than the bore.

2. A holding device of the class described comprising a body part having an enlargement at one end thereof with a bore in said body part passing through the enlarged end to an appreciable distance from the other end, the enlarged end of the body part being split to make this end of the device slightly resilient, screws passing through the enlarged part for imparting a clamping action to the resilient portion, the closed end of the body part having a center hole therein, a split bushing adapted to be inserted in the bore whereby the device can be used on an object of smaller diameter than the bore, said bushing having recesses therein for receiving part of an extraction tool.

In testimony whereof we affix our signatures.

ROLLAND R. CLARK.
RAYMOND A. FONTAINE.